United States Patent Office 2,879,225
Patented Mar. 24, 1959

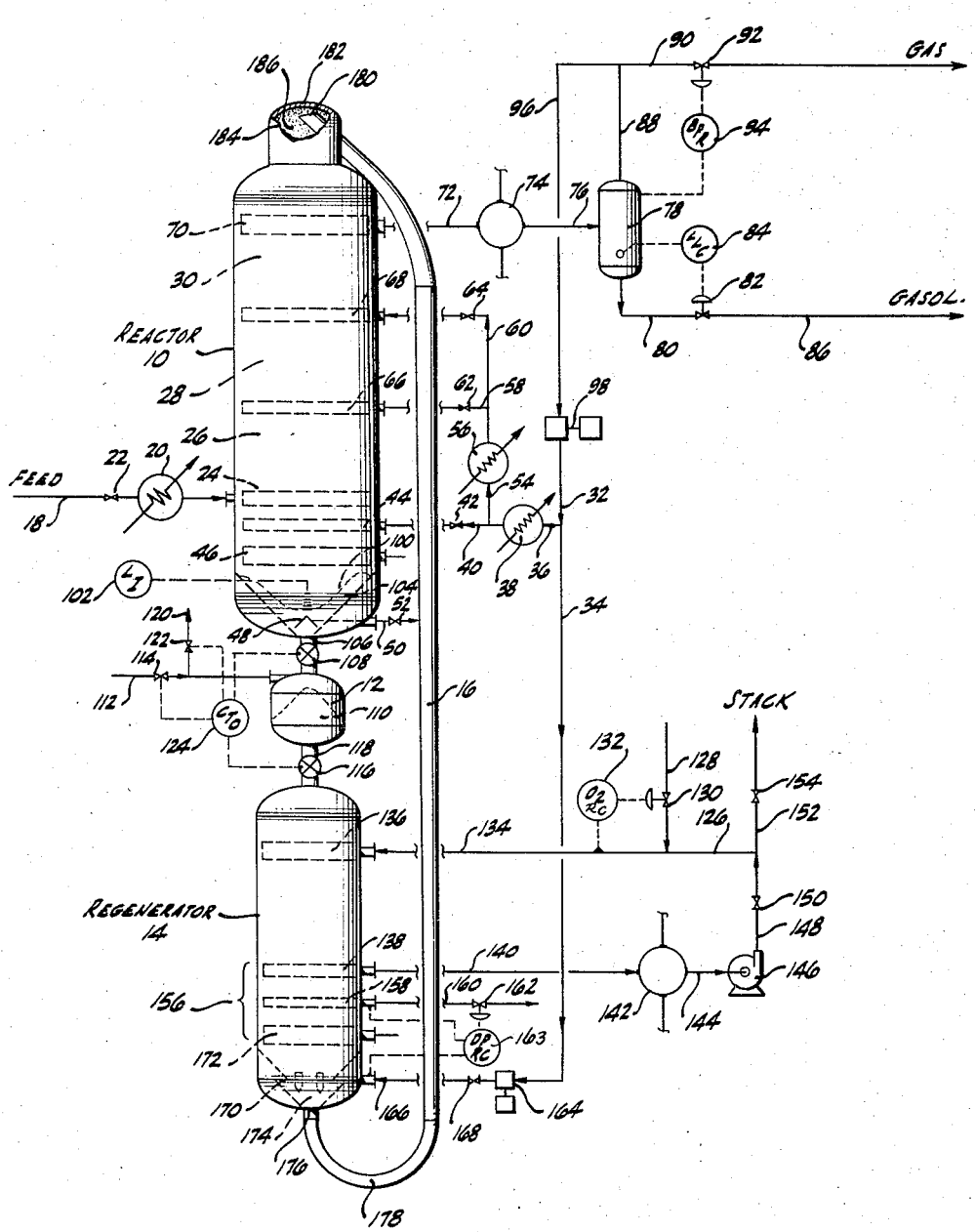

2,879,225

SOLIDS-FLUID CONTACTING PROCESS

Robert C. Oliver and Cloyd P. Reeg, Long Beach, Calif., assignors to Union Oil Company of California, Los Angeles, Calif., a corporation of California Application November 25, 1955, Serial No. 548,959

6 Claims. (Cl. 208—136)

This invention relates to an improved process for contacting solids with fluids and in particular relates to an improved hydrocarbon conversion process for the upgrading of fuels, solvents, and the like in which the low grade hydrocarbon is contacted directly under hydrocarbon conversion conditions of pressure, temperature, and compostion with a recirculating mass of solid granular contact material. Specifically this invention is an improvement in those hydrocarbon conversion and other contacting processes in which granular solids are passed downwardly as a moving bed through a reaction zone in contact with fluids to be treated and forming spent granular solids, the spent solids are then passed through a regeneration zone in contact with a regeneration gas to restore the activity of the granular materials, and then the regenerated solids are pretreated in a separate step prior to reintroduction into the reaction zone.

Modern chemical engineering practice includes a great many catalytic and noncatalytic solids-fluid contacting processes for the treatment of solids or the treatment of fluids or both. In many of these processes the contact material does not become spent or deactivated during prolonged use. However in most processes, such as in the catalytic hydrocarbon upgrading and conversion processes, the contact material degenerates due to the deposit of a hydrocarbonaceous material referred to generally as catalytic coke, and other causes. To continue the proceess a regeneration or reactivation of the solid material is required and again using hydrocarbon conversion processes as an example this may be done by contacting the spent contact material with an oxygen-containing gas.

The description of the present invention is conducted generally with reference to the conversion of hydrocarbons in the presence of solid granular contact material, but it is to be understood that the principles of this invention are not limited only to such processes. They are applicable to other processes in which regeneration of the contact material is required and in which a pretreatment of the thus regenerated material is desirable prior to returning the solid material to the reaction zone.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 750° F. and including the light and heavy naphthas or gasolines and the light and heavy gas-oil fractions, are treated at relatively high pressures and temperatures in the presence of solid contact materials to upgrade them. These treatments desulfurize, denitrogenate, hydrogenate, dehydrogenate, reform, aromatize, isomerize, or polymerize such hydrogen fractions to produce such products having desirable properties which particularly well suit them for hydrocarbon cracking feed, gasoline blending stock, or diesel or jet engine fuels, and the like.

In the particular field of gas-oil and gasoline desulfurization and in gasoline reforming, the particular chemical reactions involved are conducted at temperatures ranging between about 600° F. and about 850° F. for desulfurization and at temperatures of from about 700° F. to about 1100° F. for reforming. The reactions are usually effected in the presence of a catalyst and between about 500 s.c.f and about 10,000 s.c.f. of hydrogen recycle gas per barrel of feed. These reactions have been found to be considerably improved by conducting them at elevated pressures ranging from about 50 p.s.i. (pounds per square inch) to about 2500 p.s.i., pressures of the order of between 250 p.s.i. and about 1500 p.s.i. being often used.

The regeneration of spent hydrocarbon conversion catalysts is ordinarily conducted in a separate catalyst regeneration zone in those processes in which the granular contact material is recirculated. The regeneration zone is disposed above or below the reaction zone in a single column structure or it may be disposed parallel to the reaction zone in a two column structure. In the first modification the solids are conveyed from the bottom of the lower zone to the top of the upper zone and in the second modification the solids are conveyed twice, once from the bottom of each column to the top of the other column. In either modification elongated sealing legs are required at the solids inlets and often also at the solids outlets of each zone. In some cracking processes these sealing legs are approximately 75 feet high to maintain a pressure differential on the order of only 10 to 15 p.s.i.g. (pounds per square inch gauge). In general the single column structure is preferable from the standpoint that the solids are only picked up and conveyed once rather than twice and although the conveyance distance is approximately the same, the solids loss due to attrition and the equipment erosion is generally lower. The presence of sealing legs however is a distinct disadvantage since they are relatively inefficient ways of maintaining pressure differentials, they are expensive because they unduly increase the structural height, and they are inoperable as a practical matter for pressure differentials greater than about 20 to 25 p.s.i.

In some particular catalytic hydrocarbon upgrading processes in which the hydrocarbons are upgraded or converted using a chromium oxide, molybdenum oxide, or cobalt molybdate catalyst, a third treating process in addition to reaction and regeneration is frequently desirable. This involves the chemical reduction of the catalyst usually with hydrogen immediately following the oxidative regeneration and immediately preceding further contact of the catalyst with hydrocarbons in the reaction zone. In the two column modification this may require an additional column and an additional conveyor. In the one column modification the addition of this step greatly increases the height of the structure. Both of these requirements are undesirable.

In the present invention a novel method for solids conveyance and contacting has been incorporated whereby it has been found possible to eliminate one or two of the contacting columns required previously, and to reduce considerably the height of structure necessary to support equipment for carrying out the process. This structure height has been reduced approximately to the total height of the reactor and the regenerator. Furthermore, in the process of this invention, all separate conveyance and sealing leg zones as such have been eliminated. Even in those processes which require a third contacting step, this same height reduction may be realized. Instead of the extensive conveyance path through which the solids are circulated in the one and two column processes of the prior art, in the process of the present invention the solids move downwardly through the reactor and through the regenerator and then upwardly through the pretreating zone to the elevated beginning point. It is thus apparent that a very substantial reduction, as much as 40%, in the distance through which the solids move per cycle has been achieved by eliminating the sealing legs and eliminating a separate catalyst or solids pretreating zone. A correspondingly substantial reduction in granular solids loss through attrition has also been realized.

It is therefore a primary object of the present invention to provide an improved solids fluid contacting process involving a recirculatory stream of solid contact material moving entirely throughout the process as a dense moving bed.

A more specific object of this invention is to provide an improved hydrocarbon conversion process wherein the contact material recirculated in the system passes downwardly by gravity as a moving bed first through a reaction zone and then through a regeneration zone and then upwardly as a moving bed through a regenerated catalyst pretreating and conveyance zone to complete the solids cycle.

It is a particular object of this invention to provide an improved process for the upgrading of low grade gasolines or naphthas which are contaminated with hydrocarbon derivatives of sulfur and nitrogen whereby the hydrocarbon is desulfurized, denitrogenated, and aromatized, etc., in the presence of a catalyst and a recirculating stream containing hydrogen to produce high grade gasoline blending stocks, and wherein the reaction zone is superimposed above a regeneration zone, through both of which the catalyst moves downwardly as a dense moving bed, and wherein the oxidized regenerated catalyst discharged from the bottom of the regeneration zone moves upwardly as a dense moving mass concurrently with a stream of hydrogen through an elongated combined catalyst pretreating and conveyance zone to return the regenerated and pretreated catalyst to the top of the reaction zone.

It is also an object of this invention to provide an improved apparatus to accomplish the foregoing objects.

Other objects and advantages of the present invention will become apparent to those skilled in the art as the description and illustration thereof proceed.

Briefly the present invention comprises an improved process and apparatus for solids-fluid contacting in the presence of a recirculating stream of granular solid contact material which is passed successively through a reaction zone and then through a regeneration zone so as to maintain high contact efficiency. The granular solid contact material is passed by gravity from an elevated solids inlet point downwardly through a contacting or conversion zone maintained under appropriate reaction conditions of temperature, pressure, and composition and through which the fluid to be contacted is passed either concurrently with or countercurrent to the moving solids bed. The fluids are disengaged from the solids and removed from the reaction zone after passage therethrough. The spent solid contact material is removed by gravity from the bottom of the reaction zone at a controlled rate and preferably so as to control the flow distribution of the contact material downwardly throughout the entire cross sectional area of the reaction zone.

The spent solids are then passed into a mechanically sealable solids pressuring zone of relatively small vertical extent in which they are either continuously or intermittently pressured to a substantially higher pressure than that maintained in the reaction zone. This may be done by isolating a volume of spent granular material in a pressurizing zone and introducing a high pressure fluid so as to raise the pressure of fluids present in the interstices of the solids by an appropriate amount which is substantially equal to the over-all pressure differential existing between the inlet and outlet ends of the conveyance-pretreating zone described below. The pressure increase effected in the pressuring zone is ordinarily a substantial amount such as from about 25 p.s.i.g. to about 250 p.s.i.g. or more, the actual pressure increase depending upon the absolute density of the granules and the total height of the reaction, regeneration, and solids pressuring zones.

The pressured solids are then removed from the sealble pressuring zone and passed downwardly by gravity into and through the regeneration zone in the form of a dense moving solids bed. A regeneration gas is passed through this moving bed in the regeneration zone under controlled conditions of temperature and pressure and regeneration fluid composition so as to effect a substantially complete regeneration of the granular solid material.

Disposed within the regeneration zone and adjacent the bottom thereof are sealing and solids flow control zones. The sealing zone includes a seal gas disengaging zone by means of which a seal gas, comprising a mixture of a minor portion of spent regeneration gas and a minor portion of the pretreating-conveyance gas, is removed therefrom so as to isolate the regeneration zone from the conveyance-pretreating zone described below.

The regenerated solids pass downwardly from the regeneration zone to form and maintain a moving accumulation thereof which submerges the lower inlet opening of a vertically elongated conveyance-pretreating zone which communicates the bottom of the regeneration zone with the top of the reaction zone. During this conveyance step the regenerated solids are pretreated and conveyed and are introduced directly into the top of the reaction zone for subsequent downward passage therethrough as previously described. This pretreatment is thus effected simultaneously with the solids conveyance step thereby eliminating the separate pretreatment zone previously required. There are in this process no separate conveyance steps as such, there are no sealing leg zones which unduly increase the structural height of the apparatus, and therefore the granular solids circulate per cycle through the process along a path whose length is not substantially greater than twice the height of the reaction and regeneration zones. In the prior art processes on the contrary this solids flow path was frequently twice this distance.

As above indicated the regenerated granular solids move upwardly in a dense mass which is permeable to gas flow in the pretreating-conveyance zone. This is a novel form of conveyance contacting, in order to accomplish it several essential requirements must be met. These are briefly outlined below.

The granular solids flow by gravity from the bottom of the column with the conveyance fluid into the conveyance conduit inlet and are then transferred through the conveyance conduit in compact form by means of the concurrently depressuring conveyance fluid. The frictional forces generated by the conveyance fluid depressuring through the interconnected interstices of the fluid permeable compact mass of granular solids are sufficient to generate a pressure or force gradient in the desired flow direction sufficiently great to counteract opposing forces of friction of the solids sliding against the walls of the conduit as well as the opposing force of gravitation. Hereby movement of the compact porous granular mass in the direction of decreasing conveyance fluid pressure is established and maintained so long as solids are fed at the inlet and removed from the outlet.

The depressuring conveyance fluid generates a pressure drop per unit length of conduit $$\frac{dp}{dl}$$

which must be sufficient to overcome the opposing gravitational forces ($\rho_s \cos \theta$), wherein $\rho_s$ is the bulk density of the granular solids, and $\theta$ is the angular deviation of the conveyance conduit from an upward vertical reference axis. The ratio of the former to the latter is $$\frac{\frac{dp}{dl}}{\rho_s \cos \theta}$$

This factor is termed the conveyance force ratio and is the ratio of the force tending to move the solids through the conveyance conduit to the opposing forces of gravity tending to restrain such flow. The conveyance fluid must be depressured through the conduit at a rate sufficient to raise the conveyance force ratio to a value greater than 1.0 (factors in any consistent units) in order that the conveying force also exceed the friction forces resisting flow. The amount by which the conveyance force ratio must exceed a value of 1.0 is equal to the magnitude of the friction forces also tending to resist solids flow.

The granular solids are maintained during conveyance in compact form at their static bulk density by means of the application of a thrust or solids compressive force on the mass of solids issuing from the outlet of the conveyance conduit. Various means are available for applying such a force which has the effect of restricting the discharge of granular solids from the conveyance conduit, but has virtually no effect on the discharge of the conveyance fluid therefrom. A transverse thrust plate or a grid or the inner wall of a solids-receiving chamber may be spaced adjacent the outlet opening, or a static bed of solids may be used to submerge this outlet, or several of these may be used.

Thus, it is essential that the inlet of the conveyance conduit be kept submerged in a bed of solids to be conveyed, that the conveyance fluid flows through the conveyance zone at a rate sufficient to generate a conveyance force ratio greater than 1.0 throughout the conveyance zone, that means be provided for applying a compacting force against the solids discharging from the conveyance zone, and also that a solids flow control means be provided to regulate the rate at which granular solids are withdrawn from the solids-receiving vessel surrounding the conveyance zone outlet so as to maintain the outlet submerged in a moving bed of discharged solids.

The process of this invention as above described briefly is particularly applicable to the catalytic conversion or upgrading of hydrocarbons in the presence of a recirculated hydrogen stream. The process so applied may involve catalytic dehydrogeneation, cyclization, or aromatization and it may also involve catalytic desulfurization and denitrogenation, as well as other familiar hydrocarbon treating processes. When the process is so applied, the hydrocarbons to be converted are heated to conversion temperatures and passed through the reaction zone at appropriate pressures in the presence of a hydrogen recycle gas. The hydrogen recycle is then separated from the reaction zone effluent. The spent contact material comprises a coked or hydrocarbonaceous catalyst. The regeneration fluid comprises an oxygen-containing gas such as air. The conveyance-pretreating fluid comprises a gas containing hydrogen such as a portion of the recycle gas which effectively reduces the regenerated catalyst during the conveyance, particularly is such a preheating gas advantageous when the catalyst comprises chromium oxide, molybdenum oxide, or cobalt molybdate.

Obviously this is only one application of the present invention which is not intended to be limited to this application only. On the contrary it is intended that the process be applicable to any solids-fluid contacting processes in which, in addition to the usual reaction and regeneration steps, a third contacting step is required or desirable.

The present invention and the various modifications thereof will be more readily understood by reference to the accompanying drawing which illustrates an elevation view in partial cross section of the apparatus in which the three-stage contacting process referred to above is carried out, in combination with a schematic flow diagram of the process. The description of the drawing is given by way of example of the process applied in the catalytic upgrading of low grade petroleum naphtha to produce a high quality aromatic gasoline blending stock of substantially reduced sulfur analysis in the presence of a recirculating stream of granular cobalt molybdate catalyst.

The feed naphtha being upgraded in the process of this invention has the following physical properties:

Table 1

| | |
|---|---|
| Boiling range, ° F. | 150–400 |
| Gravity, ° API | 52 |
| Sulfur, weight percent | 1.9 |
| Nitrogen, weight percent | 0.015 |

The granular reforming catalyst consists of cobalt molybdate impregnated on $3/16$-inch activated alumina granules, it analyzes about 9% $MoO_3$ and 3% $CoO$ by weight. The catalyst is circulated through the column at a rate of 5000 pounds per hour. The preparation of this catalyst may be by any of the methods described in U.S. Patents Nos. 2,369,432, 2,325,033, 2,486,361, if desired, or by other methods.

The apparatus structure of the present invention consists essentially of reactor 10 superimposed above solids pressuring vessel 12 which in turn is superimposed above spent solids regenerator 14. The lower solids outlet of regenerator 14 is connected to the upper solids inlet of reactor 10 by means of conveyance-pretreating conduit or zone 16 by means of which the recirculation of granular catalyst is maintained.

The feed naphtha having the foregoing properties is pumped by means not shown through line 18 at a pressure of about 425 p.s.i.g. at a rate of about 10,000 barrels (42 U.S. gallons per barrel) per day through feed heater and vaporizer 20 at a rate controlled by valve 22 into feed engaging zone 24 disposed above the lower end of reactor 10. Herein the naphtha vapor is mixed with hydrogen recycle gas, subsequently described, engaged with the downflowing bed of catalyst, and passed upwardly successively through first reaction zone 26, second reaction zone 28, and third reaction zone 30.

The recycle hydrogen passes through line 32 at a pressure of about 425 p.s.i.g. and is divided into two portions. The minor portion flows at a rate of about 500 M s.c.f./day through line 34 and is used as subsequently described as the conveyance-pretreating gas in zone 16. The major portion passes through line 36 into and through primary recycle gas heater 38 wherein it is heated to a temperature of about 900° F. This recycle gas contains between about 50% and about 80% or more of hydrogen by volume. The heated recycle gas is divided into a first or primary portion which passes through line 40 at a rate of about 3,000 s.c.f./b. (standard cubic feet per barrel) controlled by valve 42 into primary recycle gas engaging zone 44. Most of this recycle gas passes upwardly and is combined as previously described with the feed naphtha vapor. A minor portion however passes downwardly, concurrently with the spent catalyst through catalyst flow control zone 46 and into primary seal gas disengaging zone 48. Herein it is combined with a small portion of pressuring gas and is removed in combination therewith through line 50 at a rate controlled by valve 52.

Since the dehydrogenation and aromatization of naphtha are essentially endothermic reactions and since the best results in this form of hydrocarbon upgrading are obtained by maintaining closely controlled temperatures within the reaction zone, a plurality of supplementary streams of recycle hydrogen is introduced at spaced points along the reactor between the aforementioned reaction zones. Thus the remainder of the hydrogen recycle gas flows through line 54 into secondary heater 56 wherein it is heated to temperatures between about 1000° F. and about 1500° F. This injection hydrogen passes respectively through lines 58 and 60 at rates of about 1500 s.c.f./b. controlled by valves 62 and 64 into secondary and tertiary injection zones 66 and 68.

By this means heated hydrogen is admixed with the reactant mixture of naphtha vapor and hydrogen giving up its sensible heat and overcoming the temperature decreases in the reaction zone characteristic of the endothermic reaction. As many injection zones may be used as necessary to keep the reactant gas mixture as close to the reaction zone temperature as desired. Usually two or three such injection zones between the reactor inlet and outlet will be sufficient.

The converted naphtha vapor and hydrogen mixture is disengaged from the catalyst in effluent disengaging zone 70. It flows at a temperature of about 880° F. and at a pressure of about 405 p.s.i.g. through line 72 into cooler condenser 74. Here all but the normally gaseous constituents of the effluent are condensed and the mixture passes through line 76 into separator 78. The reformed and desulfurized gasoline condensate flows on through line 80 at a rate of about 9500 barrels per day controlled by valve 82 actuated by liquid level controller 84. This gasoline is sent by means of line 86 to storage or further treating facilities not shown.

The liquid product thus obtained has the following characteristics:

Table 2

| | |
|---|---|
| Boiling range, ° F. | 100–410 |
| Gravity, ° API | 55 |
| Sulfur, weight percent max. | 0.01 |
| Nitrogen, weight percent | 0.001 |
| Knock rating (clear) | 87 |
| Knock rating (3 ml. TEL) | 95 |

The sulfur removal is 99.5%, the nitrogen removal is 93.4%, the boiling range is broadened slightly, the gravity is almost unchanged, and volumetric yield of 400° F. end point gasoline is the unusually high value of 95% by volume.

The noncondensed materials consist essentially of recycle hydrogen including hydrogen produced during the process and some normally gaseous hydrocarbons. These are removed from separator 78 through line 88. A net production of gas amounting to 4000 M s.c.f./day is removed from the system through line 90 controlled by valve 92 and back pressure regulator 94. The remainder of the gas phase consists approximately of 70% hydrogen and about 30% of hydrocarbon gases, mainly methane and ethane, is recirculated by means of line 96, and is compressed by means of compressor 98 from about 395 p.s.i.g. to about 425 p.s.i.g. This gas is recirculated through lines 32 and others previously described.

The spent catalyst collecting in the bottom of reactor 10 forms a level 100 which is indicated by level indicator 102 serving to show the inventory of solids in the system. The spent catalyst flows downwardly intermittently from solids accumulation 104 through line 106 controlled by valve 108 into solids pressuring chamber 12. With a charge of spent catalyst indicated generally as 110 and with valve 108 closed, catalyst pressuring gas (oxygen-free flue gas) is introduced through line 112 controlled by valve 114 into the pressuring chamber so as to raise the pressure of fluids in the interstices of the spent solids therein to a value of about 500 p.s.i.g. Valve 116 in outlet line 118 is then opened and the pressured solids discharge by gravity downwardly into the top of regenerator 14 for regeneration. Valve 116 is then closed, and residual gases at about 500 p.s.i.g. are vented from pressuring chamber 12 through line 120 controlled by valve 122. The pressure is thereby returned to about 400 p.s.i.g., valve 108 is reopened, and a fresh charge of spent catalyst is introduced for pressuring. The cycle is then repeated so as to pressure spent catalyst at a rate of about 7500 pounds per hour.

If desired and particularly at high relative rates of solids recirculation, a plurality of pressuring chambers 12 may be employed each with valved inlets and outlets for solids and gases as shown so as to permit a substantially continuous flow of pressured spent catalyst. All of the associated control valves are operated in a predetermined sequence by cycle timer operator 124. If desired the pressuring chambers may be substituted with one or more continuously operating rotary solids pressuring feeders of the star feeder type which permits a continuous downflow of spent catalyst through the pressure gradient without permitting the counterflow of fluid.

The pressured spent solids are introduced into the top of regenerator 14 which is maintained at an operating pressure of approximately 500 p.s.i.g. The solids pass downwardly as a moving bed and are concurrently contacted by a recirculating stream of oxygen containing regeneration gas. This gas consists of a recirculated flue gas flowing through line 126 to which a controlled quantity of air or other oxygen-containing gas is added by means of line 128 at a rate controlled by valve 130 to maintain an oxygen concentration of between about 0.5% and about 10% oxygen by volume as indicated by oxygen recorder controller 132. This fresh regeneration gas flows through line 134 into regeneration gas engaging zone 136. It passes downwardly concurrently with the solids and effects a combustion of the catalytic coke deposit on the spent catalyst forming a spent regeneration gas consisting essentially of flue gas having less than about 0.5% oxygen by volume. The major portion of this spent gas is disengaged from the regenerated catalyst in regeneration gas disengaging zone 138, it flows at a temperature of about 1200° F. through line 140 into heat exchanger 142. Herein the liberated heat of regeneration, contained in the spent regeneration gas as sensible heat, is recovered by heating another process stream such as the naphtha feed to the reactor or the hydrogen recycle stream injected into the reactor, or both. The cooled spent flue gas passes through line 144 into flue gas recycle blower 146 by means of which it is recirculated through lines 148 at a rate controlled by valve 150 into the regenerator 14 as previously described. A net production of flue gas may be discharged to the atmosphere through line 152 at a rate controlled by valve 154, if desired.

A minor portion of the spent flue gas is not disengaged from the regenerated catalyst in zone 138, but passes concurrently therewith through sealing zone 156 into secondary sealing gas disengaging zone 158. Herein it is disengaged from the spent catalyst, mixed with a minor portion of the hydrogen conveyance-pretreating gas to form a secondary seal gas mixture, and is removed through line 160 at a rate controlled by valve 162. Preferably this stream contains the net flue gas product from the regenerator and the minor portion of hydrogen.

As previously indicated a minor portion of the hydrogen recycle gas flows at a pressure of about 425 p.s.i.g through lines 32 and 34 for utilization as the conveyance-pretreating gas. This minor portion is compressed to about 505 p.s.i.g. by means of compressor 164 and passes through line 166 at a rate of about 500 M s.c.f./day controlled by valve 168 into conveyance-pretreating gas engaging zone 170. A minor portion of this gas passes upwardly as previously described through second solids feeder zone 172 for removal with the secondary sealing gas previously described.

The major portion of this conveyance-pretreating gas passes downwardly concurrently with the regenerated catalyst through catalyst accumulation 174 into the inlet opening 176 of the conveyance-pretreating zone 16. The gas flows concurrently through return bend zone 178 and then upwardly with and through the dense mass of regenerated catalyst maintained in conveyance-pretreating zone 16. Herein the regenerated catalyst is pretreated by chemical reduction forming a reduced catalyst of highest activity. The moving mass of catalyst is discharged through upper outlet opening 180 at a point below and immediately adjacent the roof 182 of solids receiving zone 184. The moving bed 186 of regenerated pretreating catalyst reverses its direction and passes downwardly by gravity through the serially connected reaction zones in reactor 10 at a rate controlled by primary solids feeder 46.

Because the bed of catalyst is continuous in dense form above feeder 46 and because the potential conveyance rate in conveyance-pretreating zone 16 exceeds the 7500 pounds per hour rate set by feeder 46, the combined effects of moving bed 186 and roof 182 establish the solids thrust or restrictive force necessary to maintain the upwardly moving catalyst in conveyance-pretreating zone 16 as a dense moving mass having substantially the catalyst static bulk density.

The spent conveyance-pretreating gas, now containing considerable quantities of water vapor, may be disengaged if desired from the conveyed catalyst by a gas disengaging means not shown but analagous to those mentioned previously and detailed below. Preferably however this pretreating gas flows concurrently with the discharged catalyst downwardly into effluent disengaging zone 70 for removal with the effluent from reactor 10.

The solids feeders 46 and 172 described generally above are preferably of the type well known in the art which are described and claimed in U.S. Patents Nos. 2,544,214 and 2,647,587.

The gas or fluid engaging and disengaging zones may be of any type well known in the art. One convenient form of these zones comprises a transverse plate sealed at its periphery against the inner walls of the regenerator or the reactor and provided with a plurality of open ended tubes dependent from this tray and opening therethrough and uniformly distributed throughout the tray cross section.

The foregoing illustrates the application of this invention to the catalytic upgrading of a low grade hydrocarbon petroleum naphtha by desulfurization and reforming to produce solvent or gasoline blending stock. In the prior art processes for accomplishing these results on a 10,000 b./d. scale a superimposed reactor-regenerator-pretreater-sealing leg combination having a height exceeding 300 feet is usually required. In the two column modification a parallel reactor and regenerator are required together with their sealing legs and this modification has a maximum elevation of from 175 to 200 feet.

In the present invention on the other hand a reactor having a diameter of about 12 feet and a height of about 60 feet and a regenerator having a diameter of about 6 feet and a height of about 20 feet are employed. The total height is approximately 100 feet because the sealing legs are not necessary in the present process and because the catalyst pretreatment is effected during conveyance rather than in a separate pretreatment zone disposed above the reaction zone. The structure required for the apparatus of this invention is thus less than about 40% as high as the maximum height structure previously required for a superimposed combination.

A number of additional advantages are realized in the present invention over those previously mentioned. A very substantial reduction in power requirement is realized in the operation of the flue gas recycle blower 146 because the regeneration zone is of reduced height. The size of the conveyance zone necessary to maintain catalyst recirculation is also extremely small relative to the gas lift or bucket elevator conveyance conventionally used. For a conveyor adequate for the process above described, a conduit having an inside diameter of about 6 inches is satisfactory.

Although the foregoing process and apparatus were described in connection with the desulfurization and reforming of hydrocarbon fractions in contact with cobalt molybdate catalyst, it should be understood that the mechanical and process advantages of the apparatus in permitting simultaneous high pressure fluid-solids contacts in a single column of substantially reduced height may be realized in other processes employing other catalysts and other reactant fluids. In addition, it should be understood that although other reforming and desulfurization catalysts may be employed in the present invention, cobalt molybdate is the preferred catalyst since it has both desulfurization and reforming activity and thus a given installation may be employed to remove sulfur and nitrogen from either naphtha or gas-oil fractions under certain temperature and pressure conditions, or by charging these temperature and pressure conditions, a petroleum naphtha or other low-grade gasoline may be reformed to reproduce premium-grade internal combustion engine fuels. In the example process above, simultaneous aromatization, desulfurization, and denitrogenation were effected with cobalt molybdate catalyst.

In the present invention applied to naphtha reforming and desulfurization, the preferred operating conditions with a cobalt molybdate catalyst are as follows:

*Table 3*

| | |
|---|---|
| Liquid hourly space velocity | 1.0 |
| Catalyst residence time in reactor _____hours__ | 24 |
| Average reactor temperature _____° F__ | 900 |
| Average reactor pressure _____p.s.i.g__ | 400 |
| Hydrogen to naphtha ratio, s.c.f. per barrel _____ | 4,000 |

When the process of this invention is supplied to the desulfurization and denitrogenation of gas-oil fraction with a cobalt molybdate catalyst the following are preferred operating conditions:

*Table 4*

| | |
|---|---|
| Liquid hourly space velocity | 2.0 |
| Catalyst residence time in reactor _____hours__ | 24 |
| Average reactor temperature _____° F__ | 700 |
| Average reactor pressure _____p.s.i.g__ | 600 |
| Hydrogen to naphtha ratio, s.c.f. per barrel _____ | 4,000 |

Particular embodiments of the present invention have been hereinabove described in considerable detail by way of illustration. It should be understood that various other modifications and adaptations thereof may be made by those skilled in this particular art without departing from the spirit and scope of this invention as set forth in the appended claims:

We claim:

1. In a catalytic contacting process wherein a moving bed of granular catalyst is circulated in series through a reaction zone in contact with a hydrocarbon reactant, a regeneration zone in contact with an oxygen-containing gas, a reduction zone in contact with hydrogen, and then back into said reaction zone, the improved method of carrying out said regeneration and transferring the catalyst from said regeneration zone to said reduction zone without substantial interchange of fluids between said two last-named zones, which comprises: maintaining the adjacent extremities of said two last-named zones at substantially the same pressure, introducing an oxygen-containing regeneration gas at the catalyst inlet end of said regeneration zone, withdrawing the major portion of spent regeneration gas at a point A near the catalyst outlet end of said regeneration zone, introducing a hydrogen-containing reduction gas at a point B near the catalyst inlet end of said reduction zone, withdrawing the major portion of reduction gas near the catalyst outlet end of said reduction zone, withdrawing a seal gas comprising the remainder of said spent regeneration gas and the remainder of said reduction gas at a point C located between points A and B, controlling the rate of withdrawal of gas at point C to prevent any substantial intermingling of regeneration and reduction gases in zones upstreamwardly from point A and downstreamwardly from point B, and flowing said catalyst directly and as a substantially continuous bed through the contacting zones adjacent said points A, C and B without introducing extraneous seal gas.

2. A process as defined in claim 1 wherein said catalyst is passed by gravity flow first through said reaction zone and then through said regeneration zone, and is then conveyed upwardly through said reduction zone to said reaction zone, and wherein said upward conveyance is effected by depressuring said reduction gas upwardly through said reduction zone while maintaining the catalyst therein as a dense moving bed having substantially its static bulk density.

3. A process as defined in claim 1 wherein said catalyst comprises an active ingredient selected from the class consisting of molybdenum oxide, chromium oxide, and cobalt molybdate.

4. A process as defined in claim 1 wherein said catalyst consists essentially of a minor proportion of cobalt oxide plus molybdenum oxide distended on a carrier which is predominantly activated alumina.

5. A process as defined in claim 1 wherein said hydrocarbon reactant is a low-grade naphtha and said reaction zone is maintained at between about 700° and 1100° F., and a pressure between about 250 and 1500 p.s.i. to effect reforming.

6. An improved process for effecting the upgrading of hydrocarbons by contact with a moving bed of granular catalyst, which comprises circulating said granular catalyst downwardly by gravity through (1) an upper hydrocarbon upgrading zone, (2) an intermediate solids pressuring zone, and (3) a lower catalyst regeneration zone; then circulating said catalyst upwardly through a reduction zone as a compact moving bed having substantially its static bulk density and back into the top of said upgrading zone, passing a low-grade hydrocarbon plus hydrogen through said upgrading zone under conditions of temperature and pressure effective for catalytic upgrading, raising the interstitial fluid pressure of said catalyst in said pressuring zone by an incremental amount substantially equal to the hereinafter-defined pressure drop across said reduction zone, passing an oxygen-containing regeneration gas concurrently with the catalyst in said regeneration zone, withdrawing the major portion of spent regeneration gas at a point A near the catalyst outlet end of said regeneration zone, introducing a hydrogen-containing reduction gas at a point B near the catalyst inlet end of said reduction zone, withdrawing the major portion of said reduction gas in admixture with the hydrocarbon product from the upper end of said upgrading zone, controlling the rate of withdrawal of said major portion of reduction gas so as to maintain a pressure drop across said reduction zone sufficient to convey said catalyst upwardly as a dense moving bed, withdrawing the remainder of said spent regeneration gas and the remainder of said reduction gas at a point C located between points A and B, controlling the rate of withdrawal of gas at point C to prevent any substantial intermingling of regeneration and reduction gases in zones upstreamwardly from point A and downstreamwardly from point B, and flowing said catalyst directly and as a substantially continuous bed through the contacting zones adjacent said points A, C and B without introducing extraneous seal gas.

References Cited in the file of this patent

UNITED STATES PATENTS

| | | |
|---|---|---|
| 2,440,475 | Jacomini | Apr. 27, 1948 |
| 2,684,930 | Berg | July 27, 1954 |
| 2,689,821 | Imhoff et al. | Sept. 21, 1954 |
| 2,700,015 | Joyce | Jan. 18, 1955 |
| 2,716,050 | Hagerbaumer | Aug. 23, 1955 |
| 2,726,994 | Elliott | Dec. 13, 1955 |